United States Patent Office 3,557,576
Patented Jan. 26, 1971

3,557,576
ELECTRICAL RESISTANCE BODY AND PROCESS
FOR ITS MANUFACTURE
Wilhelm Baum, Erlangen, Germany, assignor to Siemens
Aktiengesellschaft, a corporation of Germany
Continuation-in-part of application Ser. No. 440,683,
Mar. 18, 1965. This application Oct. 24, 1965,
Ser. No. 504,343
Claims priority, application Germany, Nov. 18, 1964,
S 94,228, S 94,229
Int. Cl. C03b 25/00, 29/00; C03c 21/00
U.S. Cl. 65—33                               6 Claims

ABSTRACT OF THE DISCLOSURE

Described is a process for producing a ceramic resistance body housing having a semiconducting glaze. The process comprises preparing a base ceramic body by melting raw materials to form a basic molten ceramic glass composition containing by weight essentially 42 to 51 percent $SiO_2$, 32 to 37 percent $Al_2O_3$, 3 to 11 percent $Li_2O$, 4 to 9 percent $TiO_2$, 4 to 12 percent $MgO$ and 1 to 4.4 percent $B_2O_3$, admixing to said basic molten ceramic glass composition from a trace up to 2.5 percent by weight of $Cu_2O$ and from a trace up to 12 percent of at least one compound selected from the group consisting of the metal oxides $CdO$, $NiO$, $Cr_2O_3$, $MnO_2$, and equimolar metallic compounds which yield said metal oxides upon heating, and devitrifying the composition in the presence of air at 700–1000° C.

This application is a continuation-in-part of my copending application Ser. No. 440,683, filed Mar. 18, 1965, now abandoned.

This invention relates to an electrical resistance body and a process for its manufacture. More particularly, the invention relates to high voltage insulators useful in cathode-drop lightning arresters of the type described in the publication: Siemens Review, vol. XXXI (1964), No. 4 at pp. 132–135, April 1964.

It is an object of the present invention to achieve more uniform distribution of the voltage over the spark gap assembly of such devices and to improve the sparkover characteristics.

It is a further object of the invention to increase the short-circuit strength in a cathode-drop lightning arrester, to make it possible to install the arrester in a variety of types of high voltage systems.

It is well known to coat high voltage insulators for increasing the coronal initial voltage and the sparkover voltage by using a semiconducting glaze. In an insulator, with or without a conventional glaze, the uneven voltage distribution along the insulator, particularly at the transition location from the metal fittings to the insulating body, causes a corona discharge to take place, and thus produces radio interference frequencies. In addition, in regions of strong air pollution, where the device is exposed to the weather (fog, dew and rain), and under conditions which are further aggravated by the formation of surface deposits, the sparkover voltage is strongly decreased when the contaminated layer becomes moist.

It is a further object of the invention to eliminate both of these shortcomings with the aid of a semiconductor glaze according to the invention.

Semiconducting glazes usually consist of a partly vitreous, partly crystalline phase and, to a large extent, are made up of spinels of the type of $AB_2O_4$, in which A stands for a bivalent metal ion, such as iron, and B stands for a trivalent metal ion, such as chromium; e.g. $FeCr_2O_4$.

On account of changes taking place in the furnace atmosphere during firing of such glaze, the formation of uniform semiconducting glazes on ceramic insulators meets with certain manufacturing difficulties.

The known semiconducting glazes of the above-mentioned type are suitable for use on conventional high voltage porcelain whose coefficient of expansion lies between 40 to $60 \times 10^{-7}/°$ C. Up to now, however, it has not as yet been possible to provide a semiconducting glaze on the surface of ceramic masses having a very small expansion coefficient of, say 20 to $0 \times 10^{-7}/°$ C., such as in the materials cordierite, spodumene or eucryptite masses, because the difference between the expansion coefficient of the mass and of the glaze is too great, and the glaze would therefore chip off due to the high tensile stresses occurring.

However, it is particularly the small expansion coefficient of the above-named ceramic masses which make them particularly advantageous for certain applications; namely, those where the insulator is exposed to rapid temperature changes, as in power plant test chambers or under the momentary effect of the arc in switching operations, or in the housing of a cathode-drop lightning arrester.

In the above-mentioned copending application Ser. No. 440,683, a resistance body and method for manufacture thereof is described wherein the resistance body is built of a formed ceramic base body having a semiconducting resistance layer at the surface of the base body. The ceramic base body comprises a glass ceramic obtained by the devitrification of a molten glass composition, with any desired coefficient of expansion. The semiconducting resistance layer at the surface of the base body comprises metal oxides, or their mixed crystals, and/or consists of an alloy layer of metal components which are those added to the glass composition but which could not be absorbed (or was only partly absorbed) by the lattice of the crystalline phase of the devitrification product.

Accordingly, the above-mentioned copending application Ser. No. 440,683 is based on the concept of creating an electrical resistor composed of a molded ceramic basic body with a semiconducting resistance layer on the surface of the ceramic basic body substance. The ceramic base body provided comprises a glass ceramic obtained by the devitrification of a molten mass composition. The semiconducting resistance layer on the surface of the base body consists of metallic oxides, of mixed crystals of such oxides, and/or an alloy layer of the metal components added to the glass composition which are not, or which are only partly, taken up by the lattice of the crystalline phase of the devitrification product. The ceramic base body may have any coefficient of expansion. However, the base body preferably consists of a glass ceramic having an expansion coefficient of 0 to $20 \times 10^{-7}/°$ C. The crystalline main phase of the ceramic base body contains beta-eucryptite, beta-spodumene or cordierite.

It has been found that, in the manufacture of a glass ceramic whose devitrification product consists mainly of beta-eucryptite, the metallic impurities of technical raw materials, chiefly iron, are not taken up in the crystalline lattice of the eucryptite, but rather that the impurities wander or migrate in a sort of segregation to the grain boundaries and, therefore, also migrate to the surface of the molded original glass body. During the devitrification process, e.g. at ambient air atmosphere, the metallic impurities are there oxidized in whole or in part, forming a semiconducting layer or, generally speaking, a layer with a comparatively low surface resistance.

Such segregation of "foreign" metallic cations, as compared to the crystalline nature of the devitrification product, during the devitrification process, is employed, in accordance with another feature of the invention, for the production of the semiconducting superficial resistance layer on the ceramic having a very small coefficient of expansion. The application of this principle, however, is not restricted to use on glass ceramics containing eucryptite or on glass ceramics having low coefficient of expansion, but may also be generally applied where the phase crystallizing in the glass matrix cannot or can only partially make up foreign metal cations in its lattice.

Moreover, according to another feature of the invention, by means of precisely controlled addition of one or more components to the pure glass composition of a glass ceramic, the surface resistance may be controlled in a desired manner. Through such precise addition, spinels, for example of the type of $AB_2O_4$, as above explained, may arise in the semiconducting surface in an oxidizing atmosphere.

Under controlled adjustment of the partial oxygen pressure in the devitrification atmosphere, the oxidized portion in the surface can be reduced, according to another feature of the invention, in favor of a stronger metal-conducting layer. Through the choice of the metallic components and control of the devitrification atmosphere, the surface resistance may thus be controlled in a desired manner. The metal components are preferably admixed in pairs to the glass composition to form the semiconducting spinels of the type $AB_2O_4$. The following metals of their oxides or salts are particularly suitable: iron, chromium, antimony, nickel, copper, manganese, cobalt, zinc, tin and titanium.

As mentioned, the ceramic base body preferably consists of a glass ceramic with a coefficient of expansion of 0 to $20 \times 10^{-7}/^\circ C$. During the devitrification process, the semiconducting surface develops over the entire base body, since the glass, as a homogenous mass, contains at each locality the components which had been added for the purpose of developing a semiconducting surface.

Tests concerning the temperature dependence of the surface resistance of said semiconducting surface have shown that it approximately meets the generally applicable equation:

(a) $$\rho_t = \rho_0 \rho^{\frac{c}{T}}$$

or also (b) $$\rho_t = \rho_0 \rho^{-C'T}$$

wherein $\rho_0$ (rho sub zero) and C are positive, temperature-dependent constants, and T is the absolute temperature. In both cases, the temperature coefficient of the resistance $$\frac{1}{\rho} \frac{\delta \rho}{\delta T}$$

is negative.

For many electro-technical uses, this results of having a negative temperature coefficient has certain advantages. However, in the use of high-voltage, high capacity resistances, the negative temperature coefficient has a very detrimental effect, because the resistance layers become heated and ultimately lose their stability if the heat dissipation is insufficient. Certain resistance regions are suitable for the use with excess voltage conductors in spite of deviating surrounding temperature, for example in cases of intense sun radiation. The resistance tolerances are, however, of a very narrow margin, so that very strict technical demands must be observed.

As a further and preferred development of the above-mentioned copending application Ser. No. 440,683, the present invention relates to a method for producing an electrical resistance body from a formed, ceramic base body having a semiconducting surface resistance layer, whereby the temperature coefficient of the resistance of the semiconducting resistance layer at the surface progresses from mildly negative, via zero, to mildly positive. This course of the temperature coefficient of the semiconducting resistance layer is obtained, according to the present invention, by producing the base body, through controlled devitrification, of glass compositions combining the following ingredients:

| | Weight percent |
|---|---|
| $SiO_2$ | 42–51 |
| $Al_2O_3$ | 32–37 |
| $Li_2O$ | 3–11 |
| $TiO_2$ | 4–9 |
| $MgO$ | 4–12 |
| $B_2O_3$ | 1–4.4 |

Furthermore, in addition, ingredients added to the glass composition are: up to 2.0 weight percent $Cu_2O$ combined with one or more of the metal oxides CdO, NiO, $Cr_2O_3$, or $MnO_2$, or equimolar amounts of their respective equimolar salts, or their combination with up to 12 weight percent of another or foreign oxide addition, such as is described in detail in the examples below.

These, together with various ancillary objects and other features of the invention, which will become more apparent as the following description proceeds, are attained by this method and article of manufacture, a preferred embodiment of which is illustrated in the accompanying drawing by way of example only, wherein.

Figure 1:
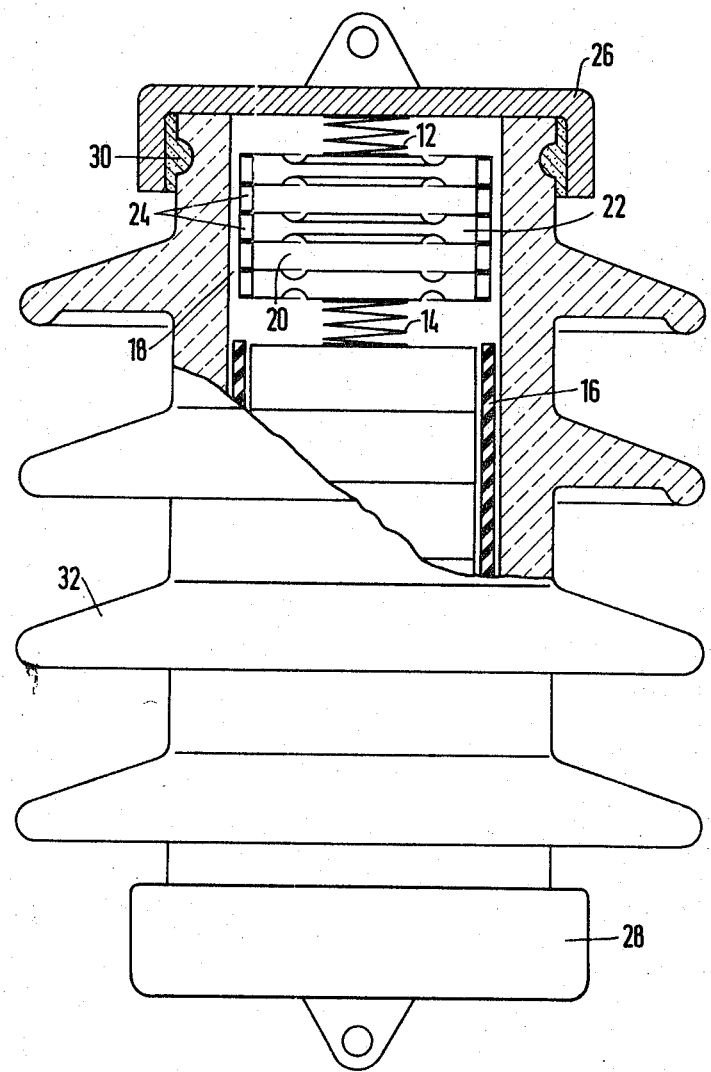
FIG. 1 is an elevation view, partly in section, of a sub-unit insulator embodying features according to the invention.

FIG. 1 shows the internal components of a sub-unit insulator which can be used for example, in a cathode-drop lightning arrester, and illustrates features of the invention. All the active parts of the insulator are resiliently mounted, with the aid of springs 12, 14 in a rugged tube 16 of insulating material. A cast-resin casing 18 of high dielectric strength surrounds the electrodes 20 of the spark gap assembly 22. As a result of their construction and the double-throated electrodes 20, these spark gap assemblies 22 have a very high arc quenching capacity. Owing to the traveling effect of the arc, the sparkover voltage remains practically constant. The discharge resistors according to the invention have a pronounced non-linear characteristic, a high current-carying capacity and have very stable electrical characteristics. The grading resistors 24 form a stack of rings around the spark gap assembly 22. These grading resistors consist of ceramic material with a high mechanical strength and thermal stability.

The sub-unit according to FIG. 1 is hermetically sealed at both ends by caps 26, 28 having flanges cemented at 30 to the housing 32. A stack of silicon carbide resistor discs is resiliently placed within the tube 16. The sub-unit is filled with nitrogen gas. In order not to endanger the immediate surroundings in the event of the arrester becoming overloaded and exploding, the top and bottom caps 26, 28 of each sub-unit may be fitted with reliable pressure-release devices (not shown). This prevents the exterior porcelain housing 32 from exploding due to excessive internal pressures caused by overloading. When sub-units such as those of FIG. 1 are connected together longitudinally, a gas-diverting hood arrangement (not shown) may be employed to immediately divert gases escaping from the pressure-release valves to the outside, with the result that an arc would be struck outside the arrester between arcing horns (not shown) located on the perimeter of the caps or flanges 26, 28. This arrangement also prevents breakage of the housing 32 due to thermal stresses which would otherwise be caused if the arc were confined to the interior of the device.

The following specific examples illustrate further how such resistance devices in accordance with the invention may preferably be produced.

Suitable for the manufacture of a resistance body according to the invention, with a resistance range lying between $10^4$ and $10^{10}$ ohms/cm.$^2$, is a ceramic base body of devitrified glass produced by the controlled devitrification of a glass composition made up of the following:

GLASS COMPOSITION (All percentages by weight)

| | |
|---|---|
| $SiO_2$ | 42–51 |
| $Al_2O_3$ | 32–37 |
| $Li_2O$ | 3–11 |
| $TiO_2$ | 4–9 |
| $MgO$ | 4–12 |
| $B_2O_3$ | 1–4 |

To the above glass compositions are added up to about 5% by weight of $Cu_2O$ or $CuO$ or their equimolar salts, referred to Cu.

It has been found that in glass ceramics having the above-indicated compositions, the addition of up to 5% by weight of copper oxide, i.e. $Cu_2O$ or $CuO$, in combination with a reducing agent is very advantageous. The reducing agent used may be, for example, metallic tin or zinc powder. The molar ratio of Cu:Sn or Cu:Zn is particularly regulated to the range of values of 0.5 to 2.0.

With the use of $Cu_2O$ and tin there is generally the lowest surface resistance at the least possible devitrification temperature of the afore-mentioned glass ceramics. Then with rising devitrification temperature, there occurs a maximum with corresponding lower surface resistance values. A similar course takes place with the temperature coefficient of the resistance as a function of the devitrification temperature. As tests have shown, the dependence of the surface resistance on the devitrification temperature is comparitively high with small additions of $Cu_2O$ and Sn up to about 1 percent by weight. However, for practical reasons in production, such additions of $Cu_2O$ and Sn are not desirable in spite of the economy. The components diffusing from the base mass into the copper oxide mass have an influence on the onsetting resulting resistance which becomes smaller with larger number of Cu-atoms in the glass compound. Even beginning with 2% by weight of $Cu_2O$ addition in combination with 2% by weight of metallic tin, the surface resistance values with ensuing differential divitrification temperature lie comparatively close together.

To obtain lower surface resistances under devitrification in air, which is more economical as compared to other types of devitrification atmosphere, and which is a prerequisite condition for all the afore-mentioned investigations and data, the addition of another, second component to the $Cu_2O$ has been found necessary. Here, the comparatively expensive tin powder may be replaced by manganese oxide, i.e. $MnO_2$, which has no reducing effect on the $Cu_2O$. It is possible to attain surface resistances down to $10^4$ ohms if there is added to the glass composition up to about 5% by weight of $Cu_2O$ or CuO, or of their equimolar salts, referred to Cu, and in combination with up to 10% by weight of manganese oxide: preferably 1.5 to 2% by weight of CuO with 1.5 to 5% by weight of $MnO_2$. Here, also, dependence of the surface resistance on the devitrification temperature in the devitrification range of 800 to 1,000° C. is very slight. This procedure is favorable from the standpoint of manufacturing technique and economy.

The following specific examples further illustrate the invention.

EXAMPLE I

The glass composition listed in the following table is of a glass ceramic which has 34% theoretical share of eucryptite. To this glass composition is added 5% by weight of $Cu_2O$, as well as 2.1% by weight of metallic tin as reducing agent. This glass mixture is kept molten at 1500° C. for several hours and homogenized, and the glass is then shaped to the desired shape of FIG. 1 in the well known manner.

| Glass composition (weight percent) | Devitrification |
|---|---|
| $SiO_2$—47.4 | |
| $Al_2O_3$—34.1 | |
| $Li_2O$—10.1 | 800° C. 1 hour; 5–7×10$^{-7}$/° C. (coefficient of expansion) (20–300° C.). |
| $TiO_2$—4.2 | |
| $B_2O_3$—4.2 | |

During the devitrification process in an ambient air atmosphere, there is formed a dull-finished surface layer having a surface resistance of about $10^6$ to $10^7$ ohms/cm.$^2$. As detailed tests have shown, this surface layer consists predominantly of CuO with a small proportion of copper-tin alloy. With the use of a non-oxidizing atmosphere such as 90% $N_2$, 10% $H_2$, the oxide layer may be decreased in favor of the metallic layer, and thus the surface resistance reduced to $10^3$ to $10^4$ ohms/cm.$^2$.

EXAMPLE II

All percentages in the following example are given by weight. To a molten composition made up of $SiO_2$—47.4%, $Al_2O_3$—34.1%, $Li_2O$—10.1% $TiO_2$—4.2%, $B_2O_3$—4.2% are added 5% of CuO. The mixture is retained in molten condition for several hours at about 1480° C. and homogenized. The poured samples after devitrification at 700° C. in an air atmosphere exhibit a surface resistance (20° C.) of $2.8 \times 10^7$ ohms/cm.$^2$. With rising devitrification temperature, the resistance drops, and after one hour's devitrification at 1000° C., for example, it amounts to only $2.4 \times 10^5$ ohms/cm.$^2$.

EXAMPLE III

To a composition made up of: $SiO_2$—48.7%, $Al_2O_3$—31.5%, $Li_2O$—7.4%, $TiO_2$—4.4%, MgO—4.4%, are added 2% $Cu_2O$, and 2.0% powdered metallic tin as a reducing agent. The mixture is briquetted and melted rapidly. After processing and devitrification of the glass samples as in Examples I and II, resistance values are attained between $6 \times 10^4$ and $2 \times 10^9$ ohms/cm.$^2$, depending on the devitrification temperature.

EXAMPLE IV

To a molten composition made up of: $Si_2O$—44.9%, $Al_2O_3$—32.3%, $Li_2O$—6.8%, $TiO_2$—4.0%, $B_2O_3$—4.0%, MgO—8.0%, are added 2.0% $Cu_2O$ and 2.0% $MnO_2$. The mixture is retained in molten condition at 1520° C. and homogenized. Then, after one hour's devitrification of the glass samples between 800 and 1000° C., surface resistance values of $4.5 \times 19^4$ up to $2 \times 10^5$ ohms/cm.$^2$ are attained.

Surface layers according to the foregoing may be used to advantage in sparkover voltage arresters such as cathode-drop lightning arresters where, in connection with comparatively high dielectric constants of an eucryptite-containing glass ceramics, they act as a control impedance, thereby simplifying the construction of the devices.

Figure 2:
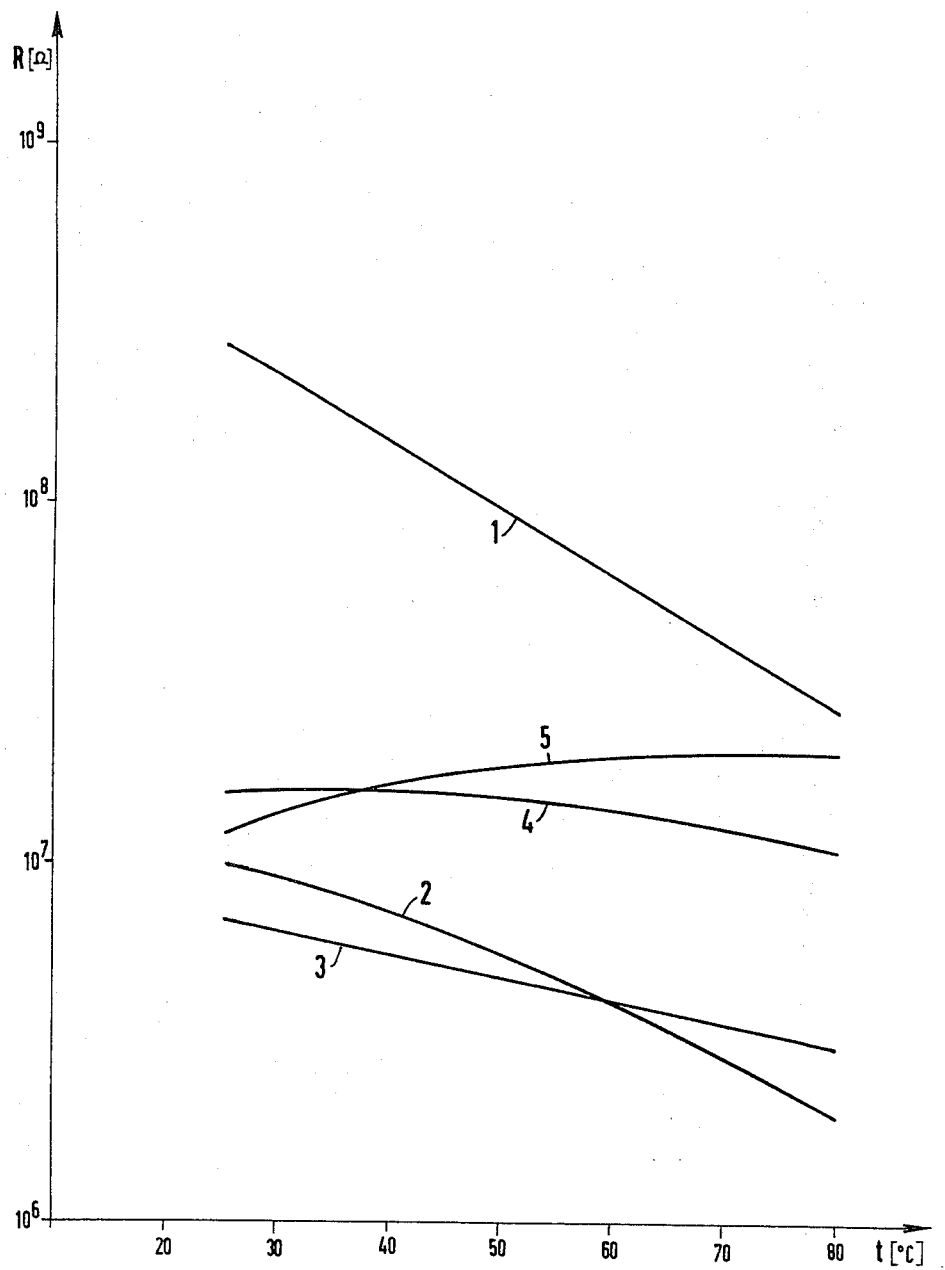
FIG. 2 is a graph illustrating by various curves corresponding to various compositions of the surface layer, the relationship of the resistance in ohms to the temperature in degrees centigrade.

FIG. 2 is a graphic illustration showing the dependence of the surface resistance R, of the semiconducting layer, on the temperature $t$. On the abscissa of FIG. 2 the temperature $t$ is given in degrees C., and on the ordinate the surface resistance R is shown in ohms.

Figure 3:
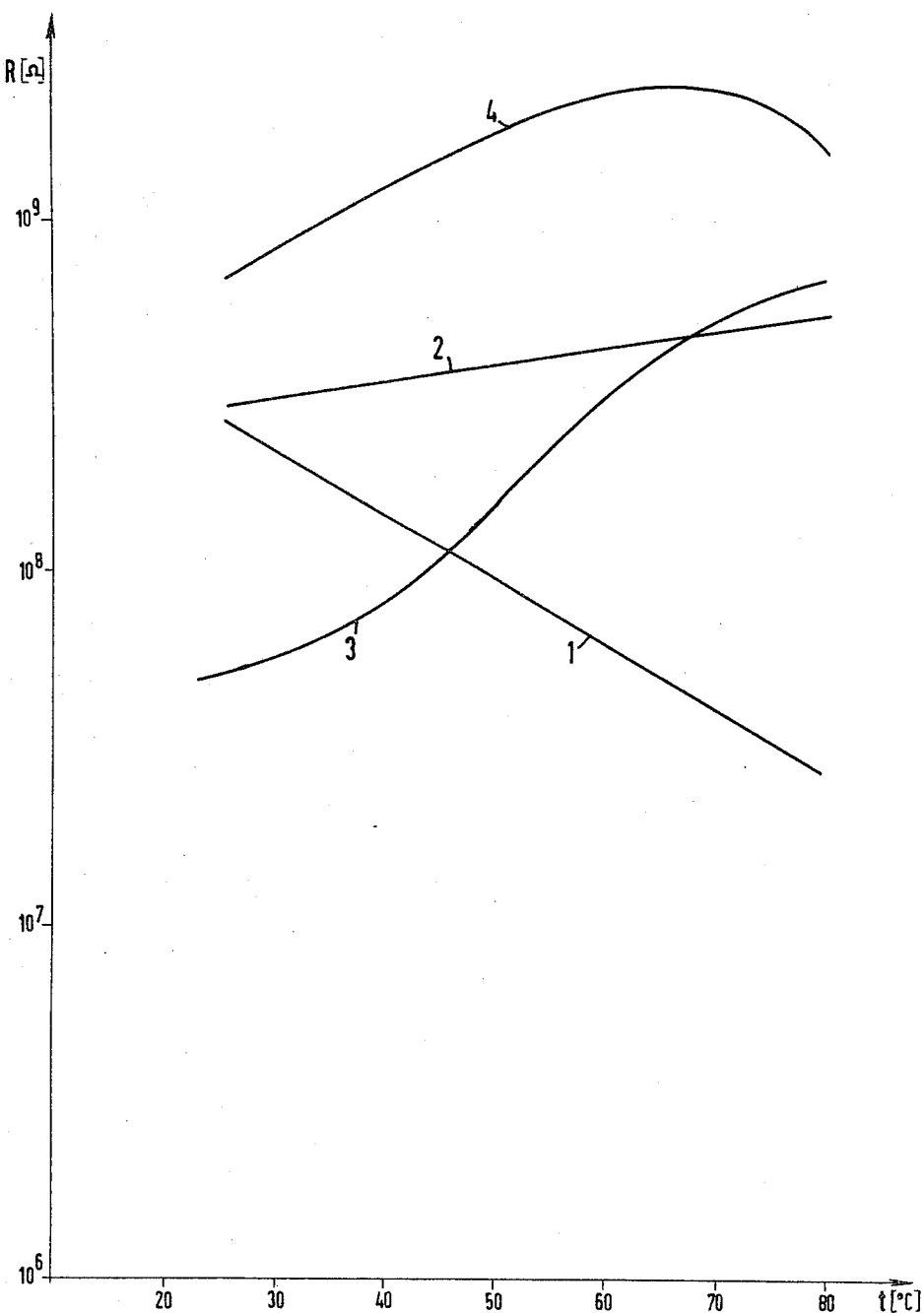
FIG. 3 is a graph similar to that of FIG. 2, showing further curves corresponding to various compositions of the surface layer.

If a glass composition of, for example, 47.4 weight percent of $SiO_2$, 34.1 weight percent $Al_2O_3$, 10.1 weight percent of $Li_2O$, 4.2 weight percent $TiO_2$ and 4.2 weight percent $B_2O_3$, which, following devitrification, has about 84% eucryptite and a very low coefficient of expansion of 5 to $7 \times 10^{-7}/°$ C. in a region of 20 to 300° C., receives an addition of 2 weight percent $Cu_2O$ and 2 weight percent metallic tin, and if the glass is devitrified at 800° C. in the presence of air, the result is a CuO resistance layer at the surface whose temperature dependence is illustrated by curve 1 of FIG. 2. The same curve 1 is also shown in FIG. 3 for comparison purposes. Curve 1 shows that the temperature coefficient in this composition is strongly negative. As mentioned above, this is not suitable for technical use associated with high voltages.

The following further examples demonstrate how the negative temperature coefficient may be reduced. All samples are based on a vitreous composition of the following combination of ingredients, designated herein as composition "A":

| | Weight percent |
|---|---|
| $SiO_2$ | 47.4 |
| $Al_2O_3$ | 34.1 |
| $Li_2O$ | 10.1 |
| $TiO_2$ | 4.2 |
| $B_2O_3$ | 4.2 |

EXAMPLE V

The above glass composition "A" set forth immediately above receives an addition of 2.5 weight percent NiO, 2.5 weight percent $Cu_2O$. Following devitrification at 700° C. in the presence of air, surface resistances occur having a temperature dependence shown by curve 2 of FIG. 2. It is apparent that the resistance drop over the corresponding temperature range no longer amounts to a full exponential power of ten.

EXAMPLE VI 1 weight percent $Cu_2O$, 2.5 weight percent CdO as well as 5 weight percent $MnO_2$ are melted and added as an addition to the afore-mentioned glass composition "A." Subsequent to devitrification at 1000° C., in the presence of air, a resistance-temperature course results which is shown in curve 3 of FIG. 2. Devitrification of the same glass at 800° C., in the presence of air, results in a resistance-temperature curve according to curve 5.

EXAMPLE VII

The same glass composition "A" is admixed with 1 weight percent $Cu_2O$, 2.5 weight percent CdO and 2.5 weight percent $MnO_2$. Following devitrification at 700° C., in the presence of air, the resistance-temperature course proceeds according to curve 4.

EXAMPLE VIII

The above composition "A" receives an addition of 5 weight percent NiO. After devitrification at 1000° C., in the presence of air, a resistance-temperature course occurs, as shown in curve 6 of FIG. 3. If this glass is devitrified in the presence of air at 800° C., the resulting resistance-temperature course is according to curve 7 of FIG. 3.

EXAMPLE IX

The above vitreous composition "A" receives an addition of 5 weight percent $Cr_2O_3$. Subsequent to devitrification at 800° C. in the presence of air, the resulting resistance-temperature course runs according to curve 8 of FIG. 3.

The equimolar salts referred to are those which yield the corresponding metal oxide on heating. As examples for the equimolar amounts of salt in the metal oxides above described and listed below, the following are particularly suitable:

| | |
|---|---|
| CdO | $CdCO_3$ or $Cd(NO_3)_2 \cdot 4H_2O$. |
| NiO | $NiCO_3$ or $NiCl_2 \cdot 6H_2O$. |
| $Cr_2O_3$ | $Cr_2(OH)_6 \cdot 4H_2O$ or $Cr_2(SO_4)_3 \cdot 18H_2O$. |
| $MnO_2$ | MnCO or $MnSO_4 \cdot 4H_2O$. |

The foreign oxides mentioned are preferably the metal oxides $Cu_2O$, CdO, NiO, $Cr_2O_3$ or $MnO_2$, which are admixed to the glass compositions. The addition of foreign oxides should not exceed 12 percent by weight.

It will be obvious to those skilled in the art, upon a study of this disclosure, that this invention permits of various modifications and alterations with respect to the individual compositions, components and arrangements disclosed, and hence can be embodied in processes and equipment other than as particularly illustrated and described herein, without departing from the essential features of the invention and within the scope and spirit of the claims annexed hereto.

I claim:

1. Process for producing a ceramic resistance body housing having a semiconducting glaze thereon, comprising the steps of preparing a base ceramic body by melting raw materials to form a basic molten ceramic glass composition containing by weight essentially 42 to 51 percent $SiO_2$, 32 to 37 percent $Al_2O_3$, 3 to 11 percent $Li_2O$, 4 to 9 percent $TiO_2$, 4 to 12 percent MgO and 1 to 4.4 percent $B_2O_3$, admixing to said basic molten ceramic glass composition from a trace up to 2.5 percent by weight of $Cu_2O$ and from a trace up to 12 percent of at least one compound selected from the group consisting of the metal oxides CdO, NiO, $Cr_2O_3$, $MnO_2$, and equimolar metallic compounds which yield metallic oxides in the surface layer and subsequently heating and devitrifying the admixed combined composition in the presence of air at 700–1000° C. to form a semiconducting metallic oxide layer thereon.

2. The method of claim 1, wherein said basic glass composition contains by weight approximately 47.1% $SiO_2$, 34.1% $Al_2O_3$, 10.1% $LiO_2$, 4.2% $TiO_2$ and 4.2% $B_2O_3$, the percentage of $Cu_2O$ added thereto is approximately 2.5%, the compound added thereto is approximately 2.5% by weight of NiO, and the composition is devitrified in the presence of air at approximately 700° C.

3. The method of claim 1, wherein said basic glass composition contains by weight approximately 47.1% $SiO_2$, 34.1% $Al_2O_3$, 10.1% $LiO_2$, 4.2% $TiO_2$ and 4.2% $B_2O_3$, the percentage of $Cu_2O$ added thereto is approximately 2.5%, the compounds added thereto are approximately 2.5% CdO and 5% $MnO_2$ by weight, the composition is devitrified in the presence of air at 800° to 1000° C.

4. The method of claim 1, wherein said basic glass composition contains approximately 47.1% $SiO_2$, 34.1% $Al_2O_3$, 10.1% $LiO_2$, 4.2% $TiO_2$ and 4.2% $B_2O_3$, the percentage of $Cu_2O$ added thereto is approximately 1.0%, the compounds added thereto is approximately 1.0%, the compounds added thereto are approximately 2.5% CdO and approximately 2.5% $MnO_2$, and the composition is devitrified in the presence of air at approximately 700° C.

5. The method of claim 1, wherein said basic glass composition contains approximately 47.1% $SiO_2$, 34.1% $Al_2O_3$, 10.1% $LiO_2$, 4.2% $TiO_2$ and 4.2% $B_2O_3$, the percentage of $Cu_2O$ added thereto is approximately 2.5%, the compound added thereto is approximately 5.0% by weight of NiO, and the glass composition is devitrified in the presence of air at 800° to 1000° C.

6. The method of claim 1, wherein said basic glass composition contains approximately 47.1% $SiO_2$, 34.1% $Al_2O_3$, 10.1% $LiO_2$, 4.2% $TiO_2$ and 4.2% $B_2O_3$, the percentage of $Cu_2O$ added is approximately 2.5%, the compounds added thereto are approximately 5.0% $Cr_2O_3$, the glass composition is devitrified in the presence of air at approximately 800° C.

References Cited

UNITED STATES PATENTS

| | | | |
|---|---|---|---|
| 3,117,881 | 11/1964 | Henry et al. | 65—33X |
| 3,279,931 | 10/1966 | Olcott | 65—33X |
| 3,464,806 | 9/1969 | Seki et al. | 65—32 |
| 3,231,456 | 1/1966 | McMillan | 65—33X |
| 3,146,114 | 8/1964 | Kivlighn | 63—33X |
| 3,157,522 | 11/1964 | Stookey | 65—33X |
| 3,231,456 | 1/1966 | McMillan | 65—33X |
| 3,282,711 | 11/1966 | Lin | 65—33X |
| 3,275,492 | 9/1966 | Herbert | 65—33X |

FOREIGN PATENTS

| | | | |
|---|---|---|---|
| 944,571 | 12/1963 | Great Britain | 65—33 |

FRANK W. MIGA, Primary Examiner

U.S. Cl. X.R.

65—30, 32; 106—39; 252—62.5, 63.5